(12) United States Patent
Bharali

(10) Patent No.: US 10,404,750 B2
(45) Date of Patent: *Sep. 3, 2019

(54) EXTERNALLY DEFINED OBJECTS IN SECURITY POLICY

(71) Applicant: Palo Alto Networks, Inc., Santa Clara, CA (US)

(72) Inventor: Anupam Bharali, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 15/413,405

(22) Filed: Jan. 23, 2017

(65) Prior Publication Data

US 2017/0195369 A1 Jul. 6, 2017

Related U.S. Application Data

(63) Continuation of application No. 13/631,792, filed on Sep. 28, 2012, now Pat. No. 9,602,539.

(51) Int. Cl.
*H04L 29/06* (2006.01)
*G06F 21/62* (2013.01)

(52) U.S. Cl.
CPC .......... *H04L 63/20* (2013.01); *G06F 21/6218* (2013.01); *H04L 63/0263* (2013.01); *H04L 63/102* (2013.01); *H04L 63/0236* (2013.01)

(58) Field of Classification Search
None
See application file for complete search history.

(56) References Cited

U.S. PATENT DOCUMENTS

| | | | | |
|---|---|---|---|---|
| 7,577,995 | B2* | 8/2009 | Chebolu | H04L 63/102 726/2 |
| 8,205,251 | B2* | 6/2012 | Crawford | H04L 63/0236 726/1 |
| 2003/0191971 | A1* | 10/2003 | Klensin | G06F 21/6218 726/5 |
| 2005/0065935 | A1* | 3/2005 | Chebolu | H04L 63/102 |
| 2006/0031483 | A1* | 2/2006 | Lund | G06Q 10/107 709/224 |
| 2006/0288076 | A1* | 12/2006 | Cowings | H04L 51/12 709/206 |
| 2007/0028110 | A1* | 2/2007 | Brennan | G06F 21/552 713/176 |
| 2008/0052758 | A1* | 2/2008 | Byrnes | H04L 63/0263 726/1 |
| 2008/0109871 | A1* | 5/2008 | Jacobs | H04L 63/20 726/1 |
| 2008/0196099 | A1* | 8/2008 | Shastri | H04L 41/0893 726/12 |

(Continued)

*Primary Examiner* — Jason Chiang
(74) *Attorney, Agent, or Firm* — Van Pelt, Yi & James LLP

(57) ABSTRACT

Using one or more externally defined objects to at least in part define a security policy is disclosed. In some embodiments, an external object list is obtained from an external list server, and a security policy comprising one or more rules based at least in part on one or more externally defined objects comprising the external object list and based at least in part on one or more locally defined objects is defined. The security policy is enforced with respect to one or more devices and periodically updated as the external object list is updated.

16 Claims, 4 Drawing Sheets

(56) References Cited

U.S. PATENT DOCUMENTS

2009/0132718 A1\* 5/2009 Groll ..................... H04W 12/08
                                                        709/229
2009/0235324 A1    9/2009 Griffin
2011/0314546 A1   12/2011 Aziz
2012/0185914 A1\*  7/2012 Delco ................. G06F 9/45558
                                                        726/1

\* cited by examiner

EXTERNALLY DEFINED OBJECTS IN SECURITY POLICY

CROSS REFERENCE TO OTHER APPLICATIONS

This application is a continuation of co-pending U.S. patent application Ser. No. 13/631,792, entitled EXTERNALLY DEFINED OBJECTS IN SECURITY POLICY filed Sep. 28, 2012 which is incorporated herein by reference for all purposes.

BACKGROUND OF THE INVENTION

Security policy definitions for devices are typically locally specified and updated by administrators. Such a manual approach for defining security policies is not only tedious but also error prone.

BRIEF DESCRIPTION OF THE DRAWINGS

Various embodiments of the invention are disclosed in the following detailed description and the accompanying drawings.

DETAILED DESCRIPTION

Figure 1:
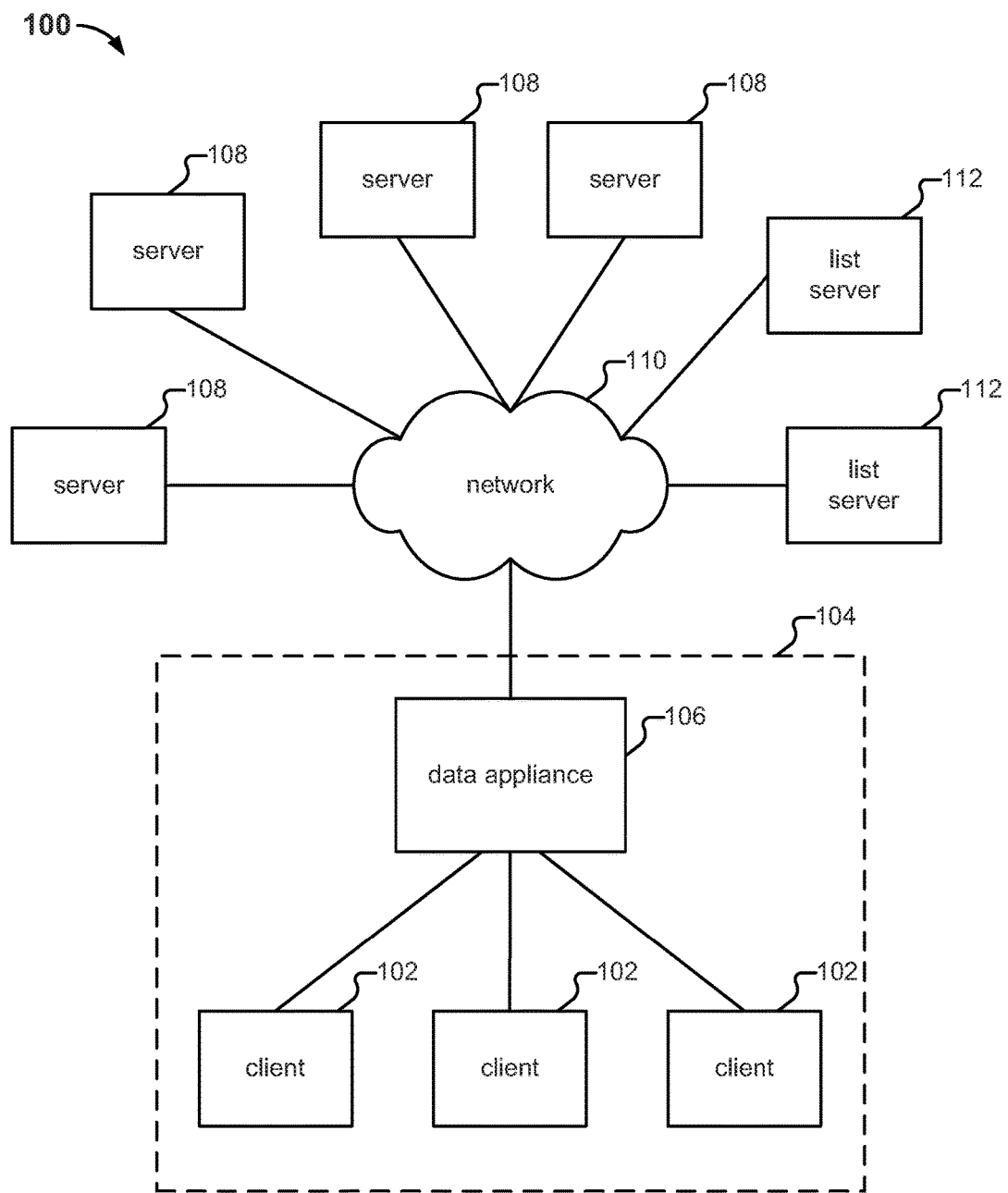
FIG. 1 is a high level block diagram illustrating an embodiment of a network environment in which externally defined objects are employed in policy definition and enforcement.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices, such as computer servers, gateways, network/routing devices (e.g., network routers), or data appliances (e.g., security appliances or other types of special purposes devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria).

As described, a policy comprises a set of one or more rules. A rule definition comprises one or more parameters or criteria, for example, to match against traffic flow, as well as an action (e.g., access granted, access denied, etc.) if one or more of the match criteria are satisfied. In some cases, match criteria comprising a rule may be hierarchically defined and checked during matching. A rule definition may comprise any one or more appropriate criteria such as source and destination zones, source and destination addresses, subnets and ports, protocols, application, virtual system, URLs or URL category, etc. A policy is typically locally configured on a device or pushed to a device from a central policy management system.

However, manual local policy configuration is not always practical or comprehensive. Many external resources exist that can be employed to better define policies. For example, several agencies around the world publish and routinely update block/access lists of address objects and URLs. As disclosed herein, it would be advantageous to automatically incorporate such externally defined lists in a policy definition and dynamically update the policy definition to reflect changes in such externally published lists. A policy may be completely or in part based on one or more externally defined lists or portions or derivatives thereof. Externally defined objects may be employed in conjunction with or instead of locally defined objects to define a policy.

FIG. 1 is a high level block diagram illustrating an embodiment of a network environment 100 in which externally defined objects are employed in policy definition and enforcement. As depicted, network environment 100 includes one or more client devices 102 within a protected network 104. A data appliance 106 exists at the perimeter of protected network 104 and facilitates communication between client devices 102 and various servers 108 over an external network 110 such as the Internet. Client devices 102 and/or data appliance 106 are further configured to communicate with one or more external list servers 112 via network 110. Client devices 102 may comprise any computing devices that can access network 110 via wired and/or wireless communications, such as computers, laptops, tablets, smart phones, or any other computing device with network communication capabilities. Data appliance 106 may comprise a security appliance, gateway, router, or other device that facilitates communication between one or more client devices 102 and devices accessible via an external network 110 such as servers 108 and 112. Servers 108 may comprise any type of server devices such as web servers, mail servers, file servers, etc.

In some embodiments, data appliance 106 includes a firewall, for example, to protect network 104 and client devices 102 within network 104. In some embodiments, a client device 102 includes a host based firewall. In various embodiments, a security policy may be centrally defined by data appliance 106 and pushed to one or more client devices 102 and/or locally configured at a client device 102. Different policies may be defined and enforced with respect to different client devices 102. In some embodiments, one or more externally defined lists (e.g., block or access lists) or portions or derivatives thereof available from one or more external list servers 112 are employed to at least in part define security policies for one or more client devices 102 and/or network 104. Such an external list may be automatically obtained (e.g., pulled) by data appliance 106 or a client 102 to configure and/or update a policy.

Figure 2:
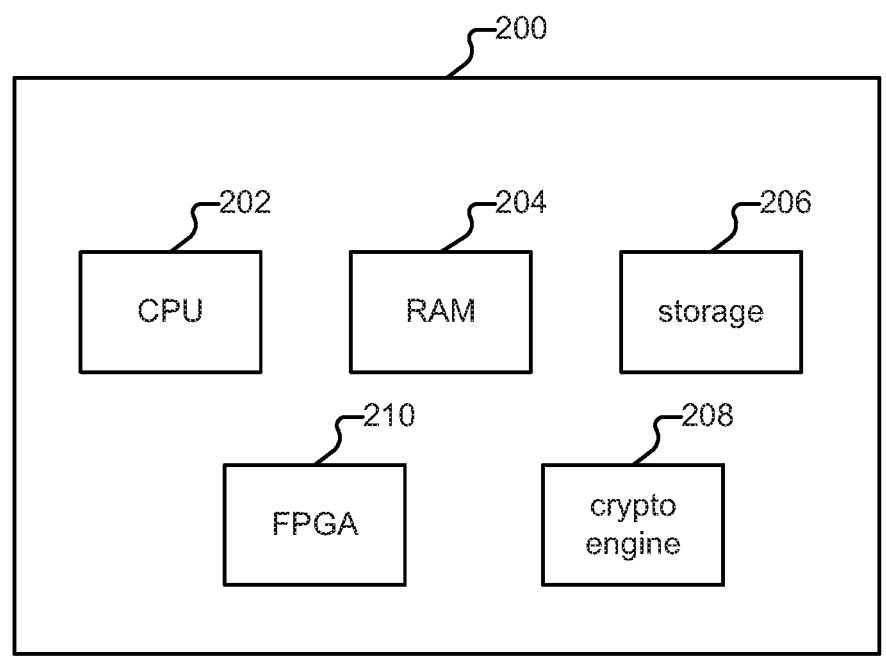
FIG. 2 is a high level functional block diagram of an embodiment of hardware components of a system that employs an externally defined list to define a policy.

FIG. 2 is a high level functional block diagram of an embodiment of hardware components of a system that employs an externally defined list to define a policy. For example, system 200 is a representation of physical components that may comprise a client device 102 or data appliance 106 of FIG. 1. As depicted, system 200 includes a high performance, multi-core CPU 202 and RAM 204. System 200 further includes storage 206 (e.g., one or more hard disks or solid state storage units), which is used to store rules and other information employed to define a policy. In some embodiments, storage 206 includes objects or object lists or parts or derivatives thereof that are obtained from an external source and employed to at least in part define a security policy. System 200 may include one or more optional hardware accelerators. For example, system 200 may include a cryptographic engine 208 configured to perform encryption and decryption operations and one or more FPGAs 210 configured to perform signature matching, act as network processors, and/or perform other tasks.

Figure 3:
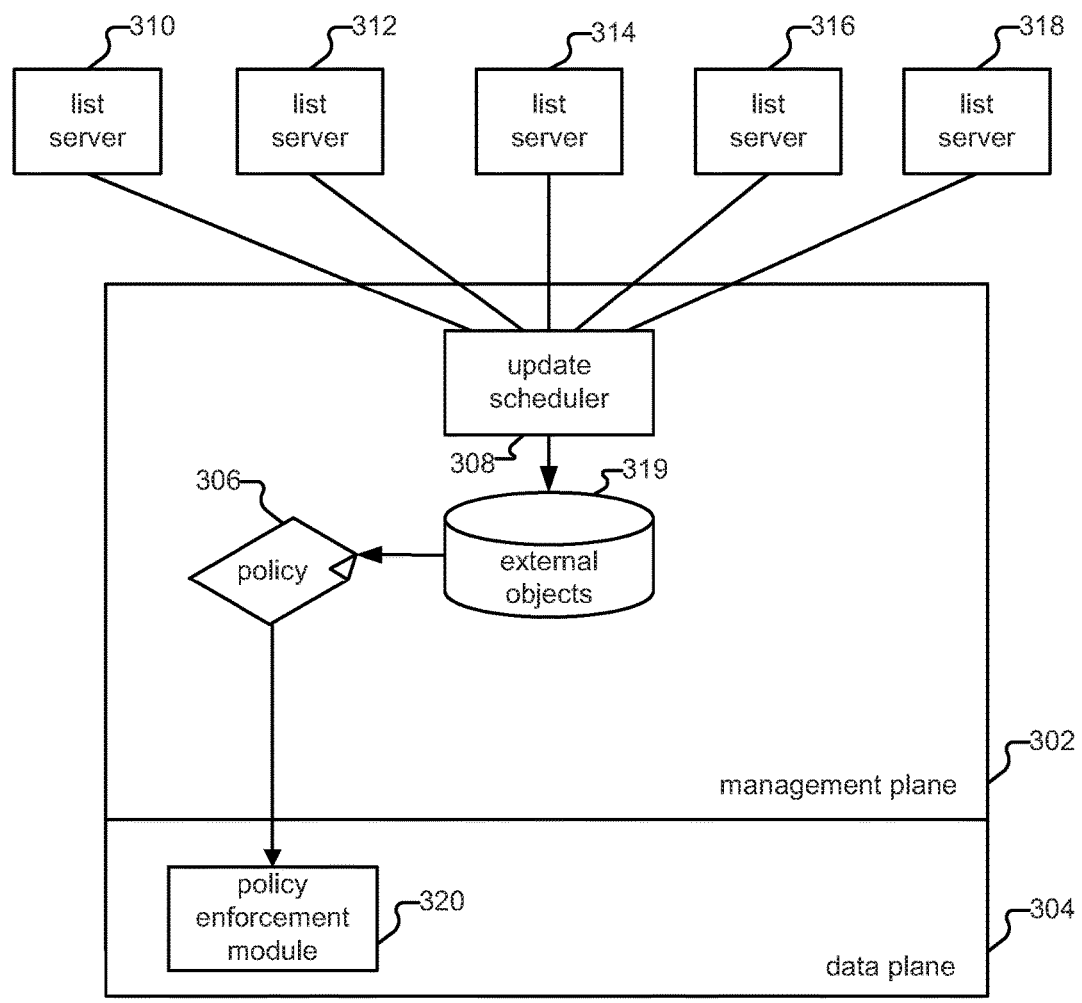
FIG. 3 is a block diagram illustrating an embodiment of components associated with policy configuration and enforcement.

FIG. 3 is a block diagram illustrating an embodiment of components associated with policy configuration and enforcement. The functionality represented by the blocks of FIG. 3, for example, may be implemented in a firewall, such as on a client device 102 and/or data appliance 106 of FIG. 1. The various blocks of FIG. 3 are logically divided as being parts of a management plane 302 and a data plane 304. The management plane is responsible for managing user interactions, such as by providing a user interface for configuring a policy 306. The data plane is responsible for managing data, such as for performing packet processing and session handling.

Update scheduler 308 is configured to retrieve object list(s) from a set of one or more list servers 310-318. List servers 310-318 may comprise external sites or servers that routinely publish object lists, such as block lists or allow lists. Elements of such lists, for example, may comprise URLs and/or address objects, which may be represented in any appropriate addressing scheme such as domain or host names (e.g., Fully Qualified Domain Names) and IP addresses (e.g., in IPv4 or IPv6 format). In various embodiments, update scheduler 308 may be configured to (periodically) pull information from list servers 310-318 and/or to receive such information as a push, as applicable.

One or more received external objects or lists are stored in database 319. Objects stored in database 319 are employed to at least in part configure policy 306. In some embodiments, external objects may be seamlessly used with locally configured objects to define policy 306. In such cases, for example, a rule may be defined to include both local objects as well as external objects. Thus, external intelligence obtained from one or more servers 310-318 may be incrementally added to a policy without causing disruption to an existing configuration. Changes to database 319 automatically result in corresponding applicable changes in policy 306, for example, without requiring administrator intervention. Policy 306 is enforced by policy enforcement module 320. Although external objects or lists are described in FIG. 3 as being stored in a database 319, in alternative embodiments, external objects or lists may be stored in volatile memory (i.e., RAM).

An external list published by a list server 310-318 may evolve as new sites are added and existing sites are removed from a block list or an allowed list. Such changes may be reflected in policy 306 by periodically updating (e.g., at a prescribed, tunable update frequency) external objects or lists 319 that are used to define policy 306. That is, update scheduler 308 is configured to periodically check for updates, pull new or updated information from list servers 310-318, and refresh the applicable contents of database 319, for example, based on an update schedule or when updated information is available.

For an HTTP or HTTPS server, list or object modifications can be checked at an (administrator or system default) frequency and new information pulled if necessary. A non-web server can also provide application logic and an external API to optimize data download to check for freshness of data. If more than one list is used in policy 306, provisions are provided to configure possibly separate update frequencies and/or communication methods for fetching new lists from associated servers.

Figure 4:
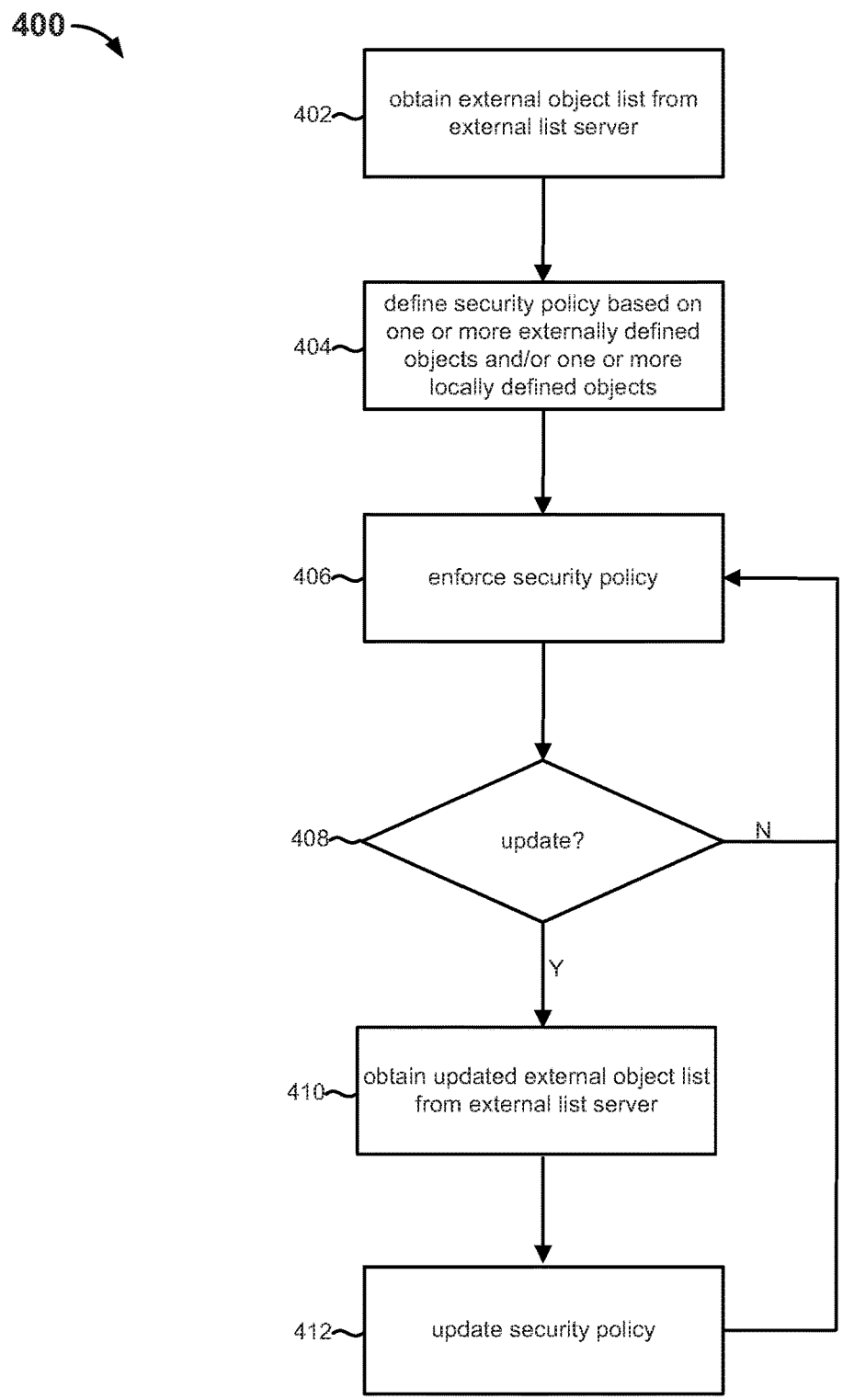
FIG. 4 is a flow chart illustrating an embodiment of a process for automatically defining, enforcing, and updating a security policy based at least in part on an externally defined object list.

FIG. 4 is a flow chart illustrating an embodiment of a process for automatically defining, enforcing, and updating a security policy based at least in part on an externally defined object list. For example, process 400 may be employed by client 102 and/or data appliance 106 of FIG. 1 to implement a security policy, for instance, with respect to a firewall. Process 400 starts at step 402 at which an external object list comprising one or more externally defined objects is obtained from an external source such as an external list server. For example, the external object list may comprise a block list or an access list. The external object list may comprise address objects expressed as, for example, domain names (e.g., Fully Qualified Domain Names) or IP (e.g., IPv4 or IPv6) addresses, and/or URLs. Furthermore, the external object list may include other information such as zones, subnets, ports, protocols, applications, categories, etc. In some cases, step 402 includes processing and/or storing the external object list or a portion or derivative thereof in a database of objects used to define a security policy. At step 404, a security policy comprising one or more rules based at least in part on one or more externally defined objects comprising the external object list and/or one or more locally defined objects is configured or defined. The security policy defined at step 404 may be seamlessly based on internally defined objects as well as externally defined objects. At step 406, the security policy is applied to or enforced with respect to one or more devices.

At step 408 it is determined whether an update to the external object list or a part thereof is available. For example, updates may be checked for according to a (tunable) update frequency or on demand at runtime. If it is determined at step 408 that an update is not available, process 400 continues at step 406 at which the existing policy is continued to be applied or enforced. If it is determined at step 408 that an update is available, an updated external object list or portion thereof is obtained at step 410 from the associated external list server, and the security policy is accordingly updated at step 412. Process 400 subsequently returns to step 406 at which the updated security policy is applied or enforced. Although described with respect to an external object list obtained from an external list server, process 400 may be similarly employed to obtain a plurality of external object lists from one or more external sources. In such cases, different update frequencies may be associated with different lists and/or sources.

Numerous variations of the disclosed techniques are also contemplated herein. For example, the described techniques may be readily expanded to a system with multiple virtual systems. In such an environment, each virtual system may have policy definitions that are independent of other virtual systems. Any virtual system may make use of a shared external list as well as specify its own list tailored for specific needs of the virtual system. In some embodiments, an intermediate or secondary server may access an external server. Such a secondary server may retrieve data from one or more external servers and possibly pre-process the data for device consumption in policy rules. In some embodiments, a central management system may define policies based on one or more external lists and push the policies to individual devices for enforcement. The central manager can be responsible for retrieval of the external lists periodically and update the devices for any changes. It may also be possible for the devices to retrieve lists directly from external entities.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
  a processor configured to:
    obtain a plurality of external object lists from a plurality of external list servers, wherein the plurality of external list servers are accessible via an external network that is separate from a protected internal network of which the system is a part;
    define a security policy comprising one or more rules based at least in part on one or more externally defined objects comprising the plurality of external object lists and based at least in part on one or more locally defined objects, wherein an object in the plurality of external object lists includes the following: a zone, a subnet, a port, a protocol, an application, and a category;
    periodically update the plurality of external object lists and, in turn, the security policy, comprising to:
      periodically obtain, at a first frequency, a first external object list from a first external list server to be used to update the plurality of external object lists; and
      periodically obtain, at a second frequency, a second external object list from a second external list server to be used to update the plurality of external object lists, the first frequency being different from the second frequency; and
    enforce the security policy with respect to a device; and
  a memory coupled to the processor and configured to provide the processor with instructions.

2. The system of claim 1, wherein an external object list comprises a block list or an access list.

3. The system of claim 1, wherein an external object list comprises one or more address objects.

4. The system of claim 1, wherein an external object list includes an address object expressed as a domain name or an IP (Internet Protocol) address.

5. The system of claim 1, wherein an external object list includes an address object expressed as a Fully Qualified Domain Name (FQDN).

6. The system of claim 1, wherein an external object list includes an address object expressed as an IPv4(Internet Protocol version 4) address or an IPv6 (Internet Protocol version 6) address.

7. The system of claim 1, wherein an external object list comprises one or more URLs (Uniform Resource Locators).

8. The system of claim 1, wherein an external object list comprises one or more URL (Uniform Resource Locator) categories.

9. The system of claim 1, wherein the processor is further configured to check for updates of the plurality of external object lists.

10. The system of claim 1, wherein the processor is further configured to refresh the plurality of external object lists on demand at runtime.

11. The system of claim 1, wherein the processor is further configured to translate an address object comprising an external object list.

12. The system of claim 1, wherein to obtain the plurality of external object lists via an intermediate server in communication with the plurality of external list servers.

13. The system of claim 1, wherein the system comprises a firewall.

14. The system of claim 1, wherein the system comprises a security appliance.

15. A method, comprising:
  obtaining, using a processor of a system, a plurality of external object lists from a plurality of external list servers, wherein the plurality of external list servers are accessible via an external network that is separate from a protected internal network of which the system is a part;
  defining a security policy comprising one or more rules based at least in part on one or more externally defined objects comprising the plurality of external object lists and based at least in part on one or more locally defined objects, wherein an object in the plurality of external object lists includes the following: a zone, a subnet, a port, a protocol, an application, and a category;
  periodically updating the plurality of external object lists and, in turn, the security policy, comprising:
    periodically obtaining, at a first frequency, a first external object list from a first external list server to be used to update the plurality of external object lists; and
    periodically obtaining, at a second frequency, a second external object list from a second external list server to be used to update the plurality of external object lists, the first frequency being different from the second frequency; and enforcing the security policy with respect to a device.

16. A computer program product, the computer program product being embodied in a non-transitory computer readable storage medium and comprising computer instructions for:

obtaining, using a processor of a system, a plurality of external object lists from a plurality of external list servers, wherein the plurality of external list servers are accessible via an external network that is separate from a protected internal network of which the system is a part;

defining a security policy comprising one or more rules based at least in part on one or more externally defined objects comprising the plurality of external object lists and based at least in part on one or more locally defined objects, wherein an object in the plurality of external object lists includes the following: a zone, a subnet, a port, a protocol, an application, and a category;

periodically updating the plurality of external object lists and, in turn, the security policy, comprising:

periodically obtaining, at a first frequency, a first external object list from a first external list server to be used to update the plurality of external object lists; and periodically obtaining, at a second frequency, a second external object list from a second external list server to be used to update the plurality of external object lists, the first frequency being different from the second frequency; and enforcing the security policy with respect to a device.

* * * * *